Dec. 23, 1947.  I. S. LIME  2,433,054
BEVERAGE BREWING AND VENDING MACHINE
Filed Nov. 10, 1943   7 Sheets-Sheet 1

Iola S. Lime
INVENTOR.

BY
ATTORNEYS.

Dec. 23, 1947.  I. S. LIME  2,433,054
BEVERAGE BREWING AND VENDING MACHINE
Filed Nov. 10, 1943  7 Sheets-Sheet 2

Iola S. Lime
INVENTOR.

BY C. A. Snowles.
ATTORNEYS.

Dec. 23, 1947.　　　　I. S. LIME　　　　2,433,054
BEVERAGE BREWING AND VENDING MACHINE
Filed Nov. 10, 1943　　　　7 Sheets-Sheet 3

Iola S. Lime
INVENTOR.

BY
*CASnowles*
ATTORNEYS.

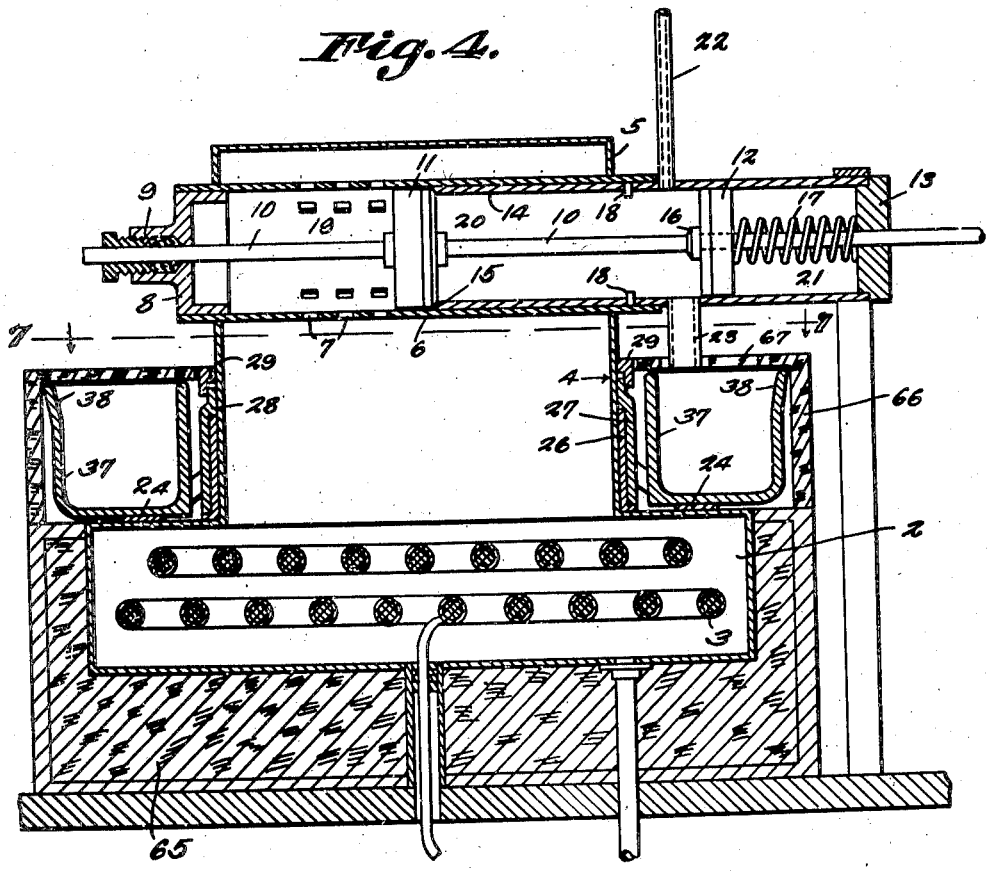
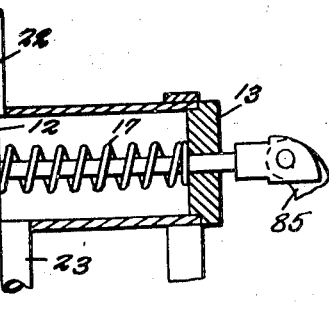

Dec. 23, 1947.  I. S. LIME  2,433,054
BEVERAGE BREWING AND VENDING MACHINE
Filed Nov. 10, 1943  7 Sheets-Sheet 5

Iola S. Lime
INVENTOR.

BY
ATTORNEYS.

Dec. 23, 1947.   I. S. LIME   2,433,054
BEVERAGE BREWING AND VENDING MACHINE
Filed Nov. 10, 1943   7 Sheets-Sheet 6
Fig. 7.
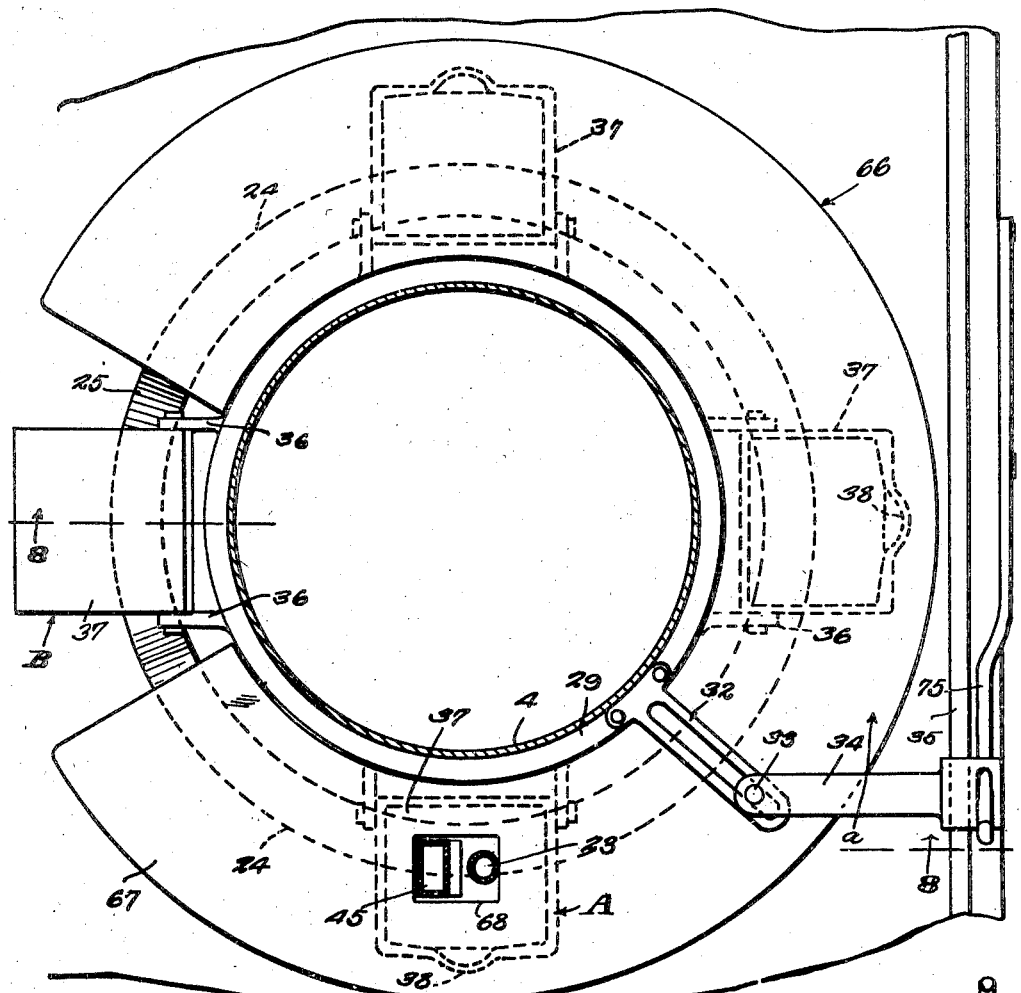
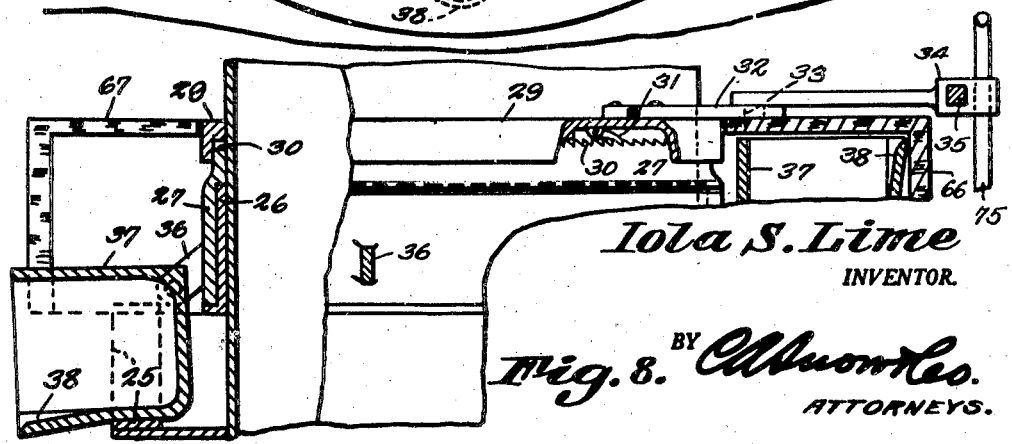
Fig. 8.
Iola S. Lime
INVENTOR.
BY
ATTORNEYS.

Dec. 23, 1947.   I. S. LIME   2,433,054
BEVERAGE BREWING AND VENDING MACHINE
Filed Nov. 10, 1943   7 Sheets-Sheet 7
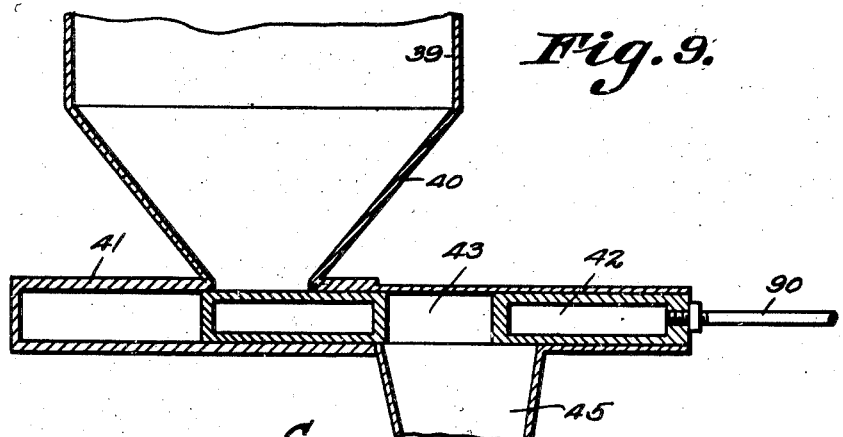
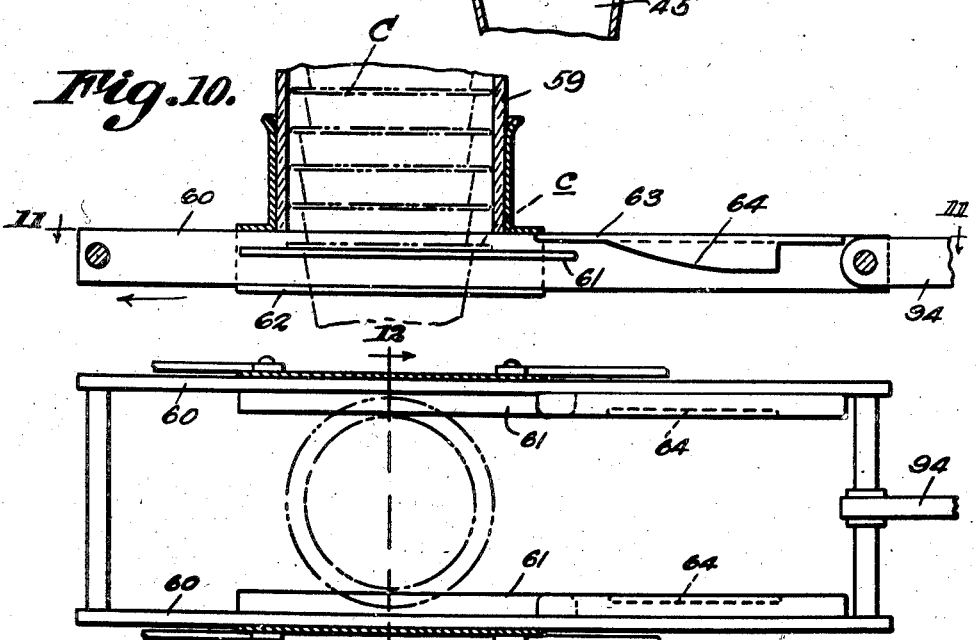
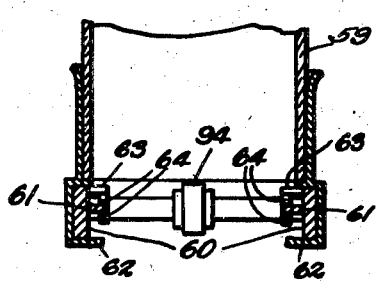
Iola S. Lime
INVENTOR.
BY Cadmow Lee
ATTORNEYS.

Patented Dec. 23, 1947

2,433,054

UNITED STATES PATENT OFFICE 2,433,054

BEVERAGE BREWING AND VENDING MACHINE

Iola S. Lime, Jefferson City, Mo., assignor, by mesne assignments, to Lymean Manufacturing Co., Inc., a corporation of Missouri Application November 10, 1943, Serial No. 509,775

4 Claims. (Cl. 99—283)

This invention relates to a machine designed for making beverages in measured quantities and vending them and while it can be used for making and vending hot chocolate and hot tea, etc., it is designed primarily for brewing coffee in measured quantities and delivering it to the purchaser by means of mechanism the operation of which can be coin or check-controlled, if desired.

Another object is to provide a machine in which a supply of hot water is maintained, there being means for dispensing this water in measured quantities into separate transfer devices or cups into which measured quantities of pulverized coffee or the like are also discharged, the operation of the mechanism serving to deliver the mixture of hot water and coffee through a strainer and into a cup provided therefor for use by the purchaser.

A further object is to provide a machine of this character which can be maintained in a sanitary condition, the liquid and solid contents being protected at all times from dust and insects.

Another object is to provide a means for maintaining the water at a constant predetermined temperature, the measuring means associated with the water supply being of new and novel construction so that a predetermined quantity of water will always be measured and delivered at each operation irrespective of the speed of operation.

A still further object is to provide a straining means for the coffee which will be washed subsequent to each straining operation and before the used portion of the strainer is again brought into working position.

A still further object is to provide a mechanism which, while it can be operated by the customer when properly released, as by a coin or check, it could, with obvious changes and additions, be released and operated electrically.

Another object is to provide an apparatus of this character which is simple and compact in construction and with which can be associated sugar and cream dispensing elements, and means for vending various items, such as sandwiches, etc., although these associated vending mechanisms constitute no part of the present invention.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 4 is an enlarged section through the water container and associated parts, said section being taken on the line 4—4, Fig. 3.

Figure 5 is a section similar to Figure 4, said section being taken through a portion only of the water tank and showing the measuring valve in position after it has been thrust forwardly during the first stage of the dispensing operation.

Figure 7 is a section through the water container and adjacent parts taken on the line 7—7, Fig. 4.

Figure 8 is a fragmentary section on line 8—8, Fig. 7, parts being broken away to show part of the mechanism employed for operating the transfer means.

Figure 9 is an enlarged vertical section through a portion of the means employed for dispensing ground coffee.

Figure 10 is an enlarged vertical section through the cup dispenser.

Figure 11 is a section on line 11—11, Fig. 10.

Figure 12 is a section on line 12—12, Fig. 11.

Figure 1:
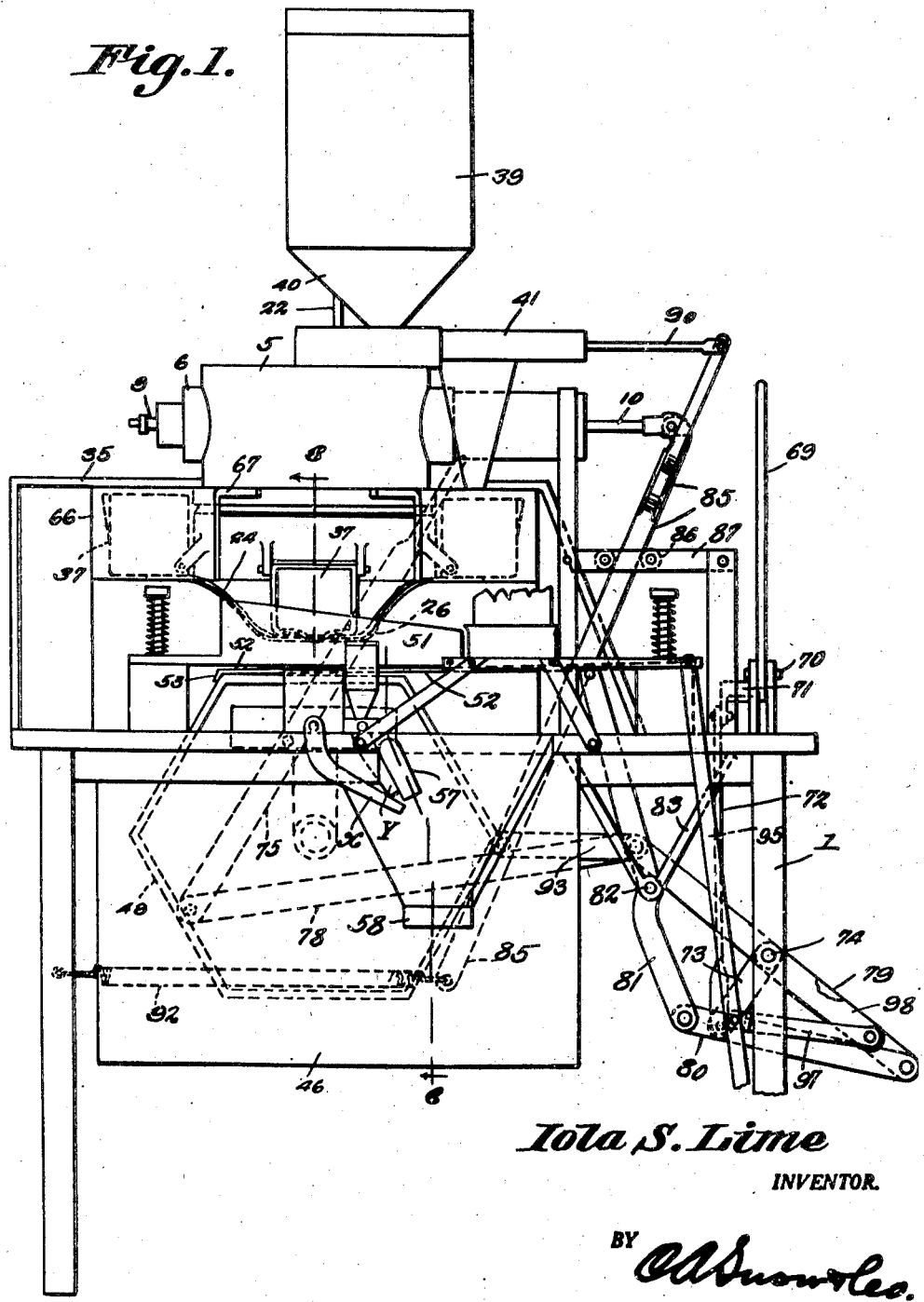
Figure 1 is a front elevation of the machine, the housing in which the apparatus can be located being removed and portions being broken away.

It is to be understood that all of the mechanism hereinafter described is to be contained within a suitable housing which can be insulated to prevent loss of heat and can be of such construction as to prevent the admission of dust and insects to the interior of the parts. It is also to be understood that there can be associated with the housing any desired vending means such as that required for use in dispensing cream, sugar, sandwiches, etc. As these are all features constituting different inventions, they have not been disclosed in the present application. Instead there has been shown only that mechanism required in the measuring, mixing and delivery of successive portions of a brewed beverage.

The present invention includes a supporting structure 1 of any desired construction on which is mounted a water container 2 in which is located an electric heating element 3 of any desired type. This container has an upwardly extending cylindrical portion 4 opening upwardly into an angular top portion 5. In this upper portion 5 is located a cylindrical outer valve casing 6 provided, near one end, with inlet openings 7 whereby water is free to flow from the container into the valve casing. That end of the casing 6 nearest the openings 7 is closed by a head 8 having a gland 9 in which is tightly fitted a slidable rod 10 extending from a piston 11. This rod, which is fixedly secured to the piston, is extended longitudinally through a secondary piston 12 slidably mounted thereon and thence through a head 13 which closes the outer end of an inner cylindrical casing member 14, the inner end of said casing member providing a seat 15 for engagement by the piston 11. A collar 16 on rod 10 constitutes a stop for limiting the movement of piston 12 in one direction on the rod 10 and said piston is held normally pressed against the collar by a spring 17 mounted on the rod between piston 12 and head 13. Stop pins 18 which serve to hold the inner and outer casings 6 and 14 assembled, also constitute means for limiting the movement of piston 12 toward the openings 7 under the action of spring 17. Under normal conditions the two pistons are located as in Fig. 4 so that the interior of the valve casing is thus divided into an end chamber 19, a measuring chamber 20, and an end chamber 21. Water, which is maintained at a desired temperature by the heating element 3, is adapted to completely fill the container 2 including its cylindrical portion 4 and its angular upper portion 5 so that the end chamber 19 is maintained full of heated water. The temperature of the water can be controlled by a thermostat in the usual way and as the use of a thermostat constitutes nothing of a patentable nature, it has not been deemed necessary to show the same.

A vent tube 22 is extended upwardly from the measuring chamber 20 to a point well above the portion 5 of the container and an outlet tube 23 is extended downwardly from said chamber 20 at a point close to the normal position of piston 12. This is shown clearly in Fig. 4.

Mounted on the lower portion of the container 2 adjacent to and concentric with the cylindrical portion 4 is a supporting rail 24. At a point remote from the discharge tube 23 the lower portion of the container 2 is interrupted to provide a gap 25 and the rail 24 has its ends extended downwardly into this gap and across the same as shown at 26 in Fig. 1 so as thus to provide a depressed portion bridging the gap.

A bearing sleeve 26 is fitted around and secured to the cylindrical portion 4 of the container and constitutes a track on which is mounted a ring 27 the upper edge portion of which can be offset as at 28 so as to engage the top edge of the sleeve and extend under and back of an operating ring 29 mounted for back and forth oscillation on the cylindrical portion 4. An annular series of ratchet teeth 30 is provided along the top edge of the ring 27 and is engaged by a pawl 31 carried by the ring 29. A longitudinally slotted arm 32 is fixedly secured to and extends outwardly from the ring 29 and is slidably engaged by a pin 33 extending from a finger 34 which is mounted to slide on a stationary guide rod 35. Thus every time the finger 34 is moved in the direction of the arrow A, in Fig. 7, the ring 29 will be caused to move in one direction about the cylindrical portion 4 and the parts can be so proportioned that each of these movements will result in a one-quarter rotation of the ring. This one-quarter rotation will result in a corresponding rotation of the ring 27 because of the engagement of pawl 31 with the ratchet teeth 30. When the parts are moved in the opposite direction, however, the pawl will slip over the ratchet teeth so that the parts are then reset to make another one-quarter rotation.

Brackets are secured to and extend outwardly from the ring 27, as shown at 36. These brackets can be arranged in pairs as shown and to each pair of brackets can be pivotally connected a transfer container 37 in the form of a cup adapted to hold enough hot water and coffee to produce one cup of beverage. Where the rings 27 and 29 make a one-quarter rotation during each operation of the apparatus, four of these containers 37 will be provided. The containers are normally supported on the rail 24 as shown particularly in Fig. 4 and each container, which is open at the top, has a pouring spout 38 at its outer side. Thus all of the containers will be supported in liquid-retaining position as they move about the cylindrical portion 4 of the water container but as each container is brought, during the completion of one movement, above the gap in the water container, it will be caused to swing outwardly and downwardly by gravity, following the depressed portion 26 of the rail 24. Thus the container will be brought to pouring position as shown at the left of Fig. 8 but, during the next one-quarter turn of the mechanism, this lowered container will be lifted upwardly and brought back to its liquid-retaining position.

At a suitable point, preferably above the level of the water container, is a container 39 for holding ground coffee. This container is provided with a bottom in the form of an outlet hopper 40 which, as shown in Fig. 9, opens into the top of a casing 41 containing a measuring valve 42. This valve is in the form of a slide having an opening 43 normally positioned above and opening into a delivery spout 45. When the slide is moved away from normal position within casing 41, the opening 43 can be brought into register with the outlet in the bottom of the container 39 so that the opening 43 thus will be filled with a predetermined amount of ground coffee. Thereafter when the valve 42 is moved back to normal position, the measured amount of coffee will be brought to a point above the spout 45 and delivered into the spout by gravity. At this time the outlet of the container 39 is closed by the valve. This will be apparent by referring to Figure 9. As shown in Figure 7 the delivery spout 45 is located close beside the spout 23 so that when each transfer receptacle 37 is brought to the filling station A in Figure 7, a measured portion of water and of coffee can be delivered thereinto.

Figure 6:
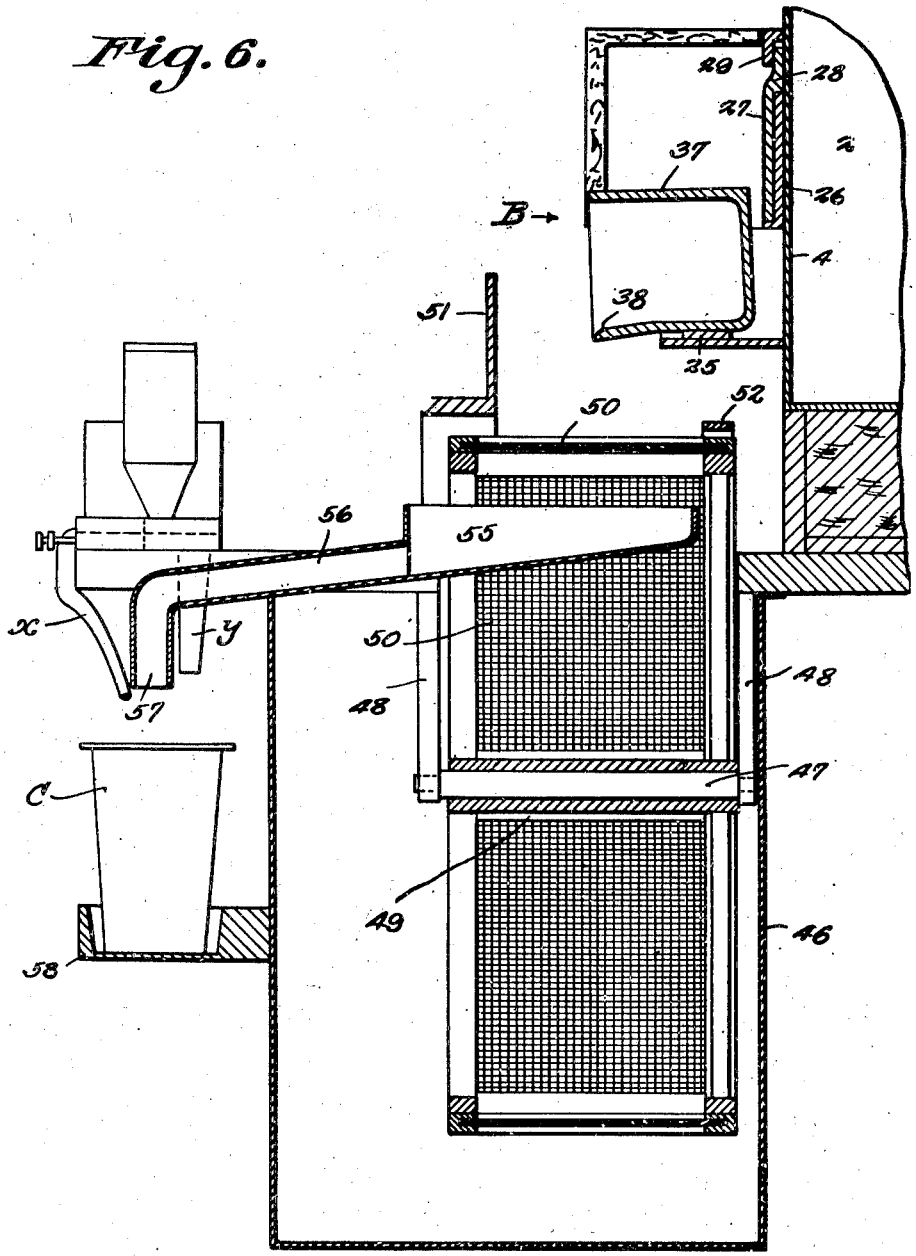
Figure 6 is an enlarged section through a portion of the apparatus, taken on the line 6—6, Fig. 1, and showing the cup-dispensing and supporting means and the means for straining and delivering the coffee from a transfer element, one of the transfer elements being shown in delivering position.

Below the delivery station B at which point each transfer container is dumped, as shown in Figures 6 and 8, there is located a receptacle or trough 46 adapted to hold water for washing purposes. A horizontal shaft 47 is supported in any suitable manner within this trough, hangers 48 being provided preferably for this purpose. A polygonal drum 49 is mounted for rotation in the trough and either rotates on the shaft 47 or rotates therewith as preferred. This drum can be hexagonal as shown in Figure 1, the flat walls thereof being in the form of screens 50 of a mesh sufficiently fine to insure proper straining of coffee when poured thereonto. The drum is normally positioned with one of its flat faces uppermost in a horizontal position and directly below the station B so that when the contents of one of the transfer containers 37 are dumped, they will drop onto and be strained by the screen adjacent thereto. A splash plate 51 can be located at station B so as to prevent the poured material from splashing past the screen thereunder and insure proper flow of the prepared material onto the screen.

An actuating rod 52 extends across the top portion of this drum and has a depending finger 53 at one end for lapping the adjacent corner of the drum as shown particularly in Fig. 1.

A receiver 55, in the form of a trough, is supported within the drum and has an inclined bottom leading to a delivery spout 56 extending forwardly from the apparatus and designed to discharge downwardly, as at 57, into a cup C positioned thereunder on a support 58. This cup may be placed on the support by hand or, if preferred, a cup-dispensing mechanism such as shown can be used. This mechanism includes a container 59 for holding a column of nested paper cups and the container opens downwardly between the sides of a slide 60 of the dispensing structure. These sides are provided, below the container, with opposed supporting ribs 61 adapted to move with the guide while stationary-supporting ribs 62 are located below and serve to support the sides of the fixture. Displacing flanges 63 are carried by the sides of the slide 60 and are adapted to move along a plane close to the bottom of the container 59 and above the level of the members 61. Thus when the parts are in their normal positions, as shown in Figure 10, the flange c of the lowermost cup C in the container will rest on the ribs 61. However when the guides 60 are moved in the direction of the arrow in Figure 10, the ribs 61 will be withdrawn from under the flange c engaged thereby while the flanges 63 which include depending cam edges 64, will ride over the unsupported cup flange c and under the flange of the next adjoining cup so that the lowermost cup thus will be pushed downwardly onto the flanges 62 while the other cups are being supported. When the sides of the slide 60 are pulled back to their normal positions as shown in Figure 10, the released cup A is free to be placed either by hand or automatically, as preferred, onto the support 58 positioned to receive the prepared beverage.

The parts thus far described constitute the essential portions of the apparatus constituting the present invention. It is to be understood that various structures may be associated therewith such as a cream dispenser X and a sugar dispenser Y, both of which can be located where a desired amount of either can be directed into the supported cup C. See Fig. 6.

It will be understood, also, that the water container 2 can be surrounded entirely or in part by insulating material indicated generally at 65, and an enclosure of insulating material indicated at 66 can be used for protecting the transfer containers 37. The top 67 of this enclosure must of course be provided with an opening 68 through which the spouts 23 and 45 extend.

The means employed for operating the working parts of this apparatus can be propelled by hand or by motor and it is intended, in practice, to control the operation by the use of check or coin-controlled mechanism. However as such mechanism constitutes no part of the present invention, it has not been shown or described. In the structure as illustrated, the operating mechanism includes a lever 69 fulcrumed as at 70 and provided with an arm 71 connected by a rod 72 to a crank arm 73 on a rock shaft 74. A lever 75, which is fulcrumed at 76, is connected to a crank arm 77 on shaft 74 by a link 78 and the upper end of this lever is extended loosely into the slide formed by finger 34 so that when the lever 75 is swung in one direction, the slide or finger 34 is also moved in one direction along rod 35, thereby to impart a one-quarter rotation to the ring 29 and the parts associated therewith, as already explained.

Another crank arm 79 is extended from the shaft 74 and is connected by a link 80 to the lower end of a lever 81 which is fulcrumed, as at 82, between hangers 83. The upper end of this lever is connected to the screen-operating rod 52 by the pivot device 84.

Figure 2:
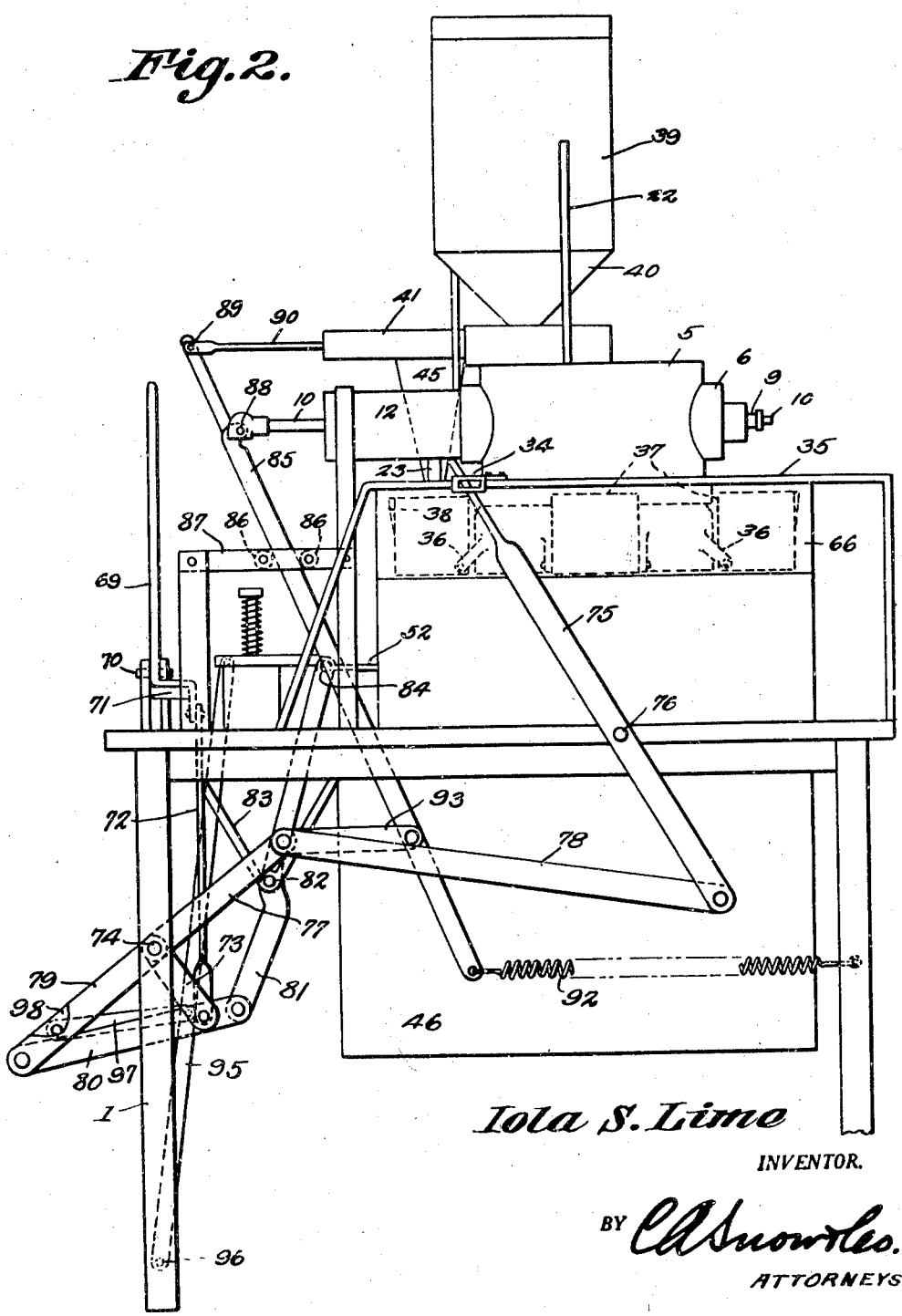
Figure 2 is a view in elevation showing the opposite or rear portion of the mechanism.

An elongated lever 85 which is mounted for limited sliding and swinging movement between guide rolls 86 mounted in a supporting strip 87, is pivotally connected, as at 88 to the rod 10 of the liquid measuring valve. The same lever is also pivotally connected, as at 89 to a rod 90 extending from the measuring valve 42. This lever is held normally in one position by a spring 92, shown in Fig. 2 and it has an operative connection, through a link 93, with the arm 54 of shaft 74.

Figure 3:
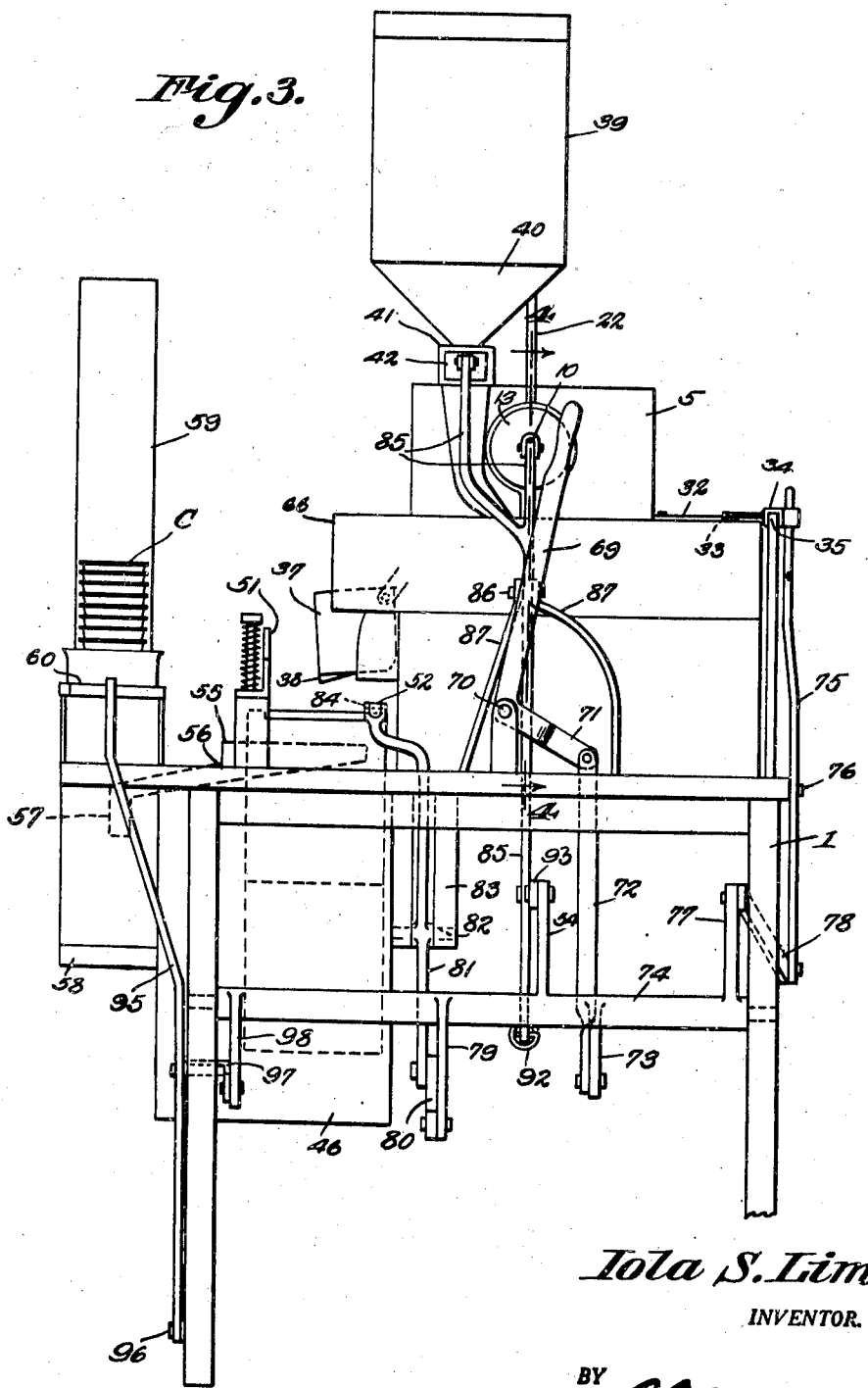
Figure 3 is a side elevation.

The cups can be dispensed by connecting the slide 60 by a link 94 to a lever 95 fulcrumed at 96 (see Fig. 3). This lever in turn is connected by a link 97 to an arm 98 extending from the rock shaft 74.

In practice the container 2 is filled with water as has already been stated and this water is maintained close to a boiling temperature by a thermostatically controlled heater. As before stated no attempt has been made to illustrate or describe the means for controlling the temperature as such means are well known in the art. When the container is filled the end chamber 19 of the water-dispensing mechanism is also filled, piston 11 being held pressed against seat 15 by the action of spring 92 through its lever 85, this spring being of such strength as to overcome the spring 17 which is held normally under compression as shown in Fig. 4.

If coffee is to be the beverage to be vended, ground coffee is placed in the container 22 and will gravitate therein to the normally closed outlet in the bottom 40 thereof.

When lever 69 is actuated away from its normal position to its other extreme position, the shaft 74 is given a partial rotation in one direction. This produces several results. Lever 75 is actuated to move the slide or finger 34 in the direction of arrow A in Fig. 7 so as to impart a one-quarter rotation to the ring 29 and to the several transfer containers which are moved by the ring and its pawl and ratchet. Thus an empty container which had been at the station B is swung upwardly onto the horizontal portion of the rail 24 and brought to station A. While this is going on the valve 42 is being pushed backwardly from the position shown in Fig. 9 so as to receive a measured quantity of coffee within opening 43. Also, during this operation, rod 9 is thrust from the position shown in Fig. 4 to the position shown in Fig. 5. This results in moving piston 11 away from its seat 15 and past the ports 7 while spring 17 forces piston 12 against the stop pins 18. When this sliding movement of rod 10 is completed, the chamber 20 has been enlarged between pistons 11 and 12 to hold a sufficient amount of hot water to fill one cup. Obviously as soon as piston 12 moves past the ports 7, hot water will rush into the chamber 20 and fill it. When piston 12 is in the position shown in Fig. 5, the outlet tube 23 is closed.

Another operation which takes place during this initial actuation of lever 64 is set up by lever 81 and its connection with shaft 74. Actuation of this lever results in pulling on rod 52 with the result that the finger 53 on said rod pulls on the screened drum and moves it from the position shown in Fig. 1 so as to bring the next adjoining screen surface into horizontal position at station B. Likewise, during this initial operation of lever 69, the lever 95 is actuated to release a cup from container 59.

After the foregoing operation the parts are all set to complete the action of the parts when lever 69 is released. This lever, being released, is actuated by a spring 92 and associated parts so that all of the levers and associated parts are returned to their initial positions. In other words spring 92 will pull lever 85 back to its initial position, thereby withdrawing the measured quantity of coffee from under the container 39 to a position above spout 45 so that it will be discharged by gravity into the transfer container 38 located under said spout. At the same time the rod 10 will be pulled to the right in Fig. 5, causing piston 12 to thrust the trapped hot water to the right in the valve casing until the collar 16 on the rod engages piston 12 and thrusts said piston to the right a sufficient distance to place chamber 20 in communication with outlet tube 23. Thus the hot water which has been measured between the two pistons, will be free to flow downwardly into the transfer container at station A. Another operation which takes place during this return of lever 69 is the return of the pawl 31 to its initial position without changing the positions of the transfer containers. Also during this operation the screen-actuating rod is pushed back to reset position as is also the slide 60 of the cup dispenser. This operation is repeated until three of the transfer containers have been filled with a mixture of coffee and hot water, all of these containers or receptacles being kept hot because they are located within a housing of insulating material. Thereafter the apparatus is set to vend the hot beverage and when lever 69 is again actuated back and forth as has already been explained, a fourth transfer container will be filled while the first transfer container which had been filled will be brought into position at the gap in container 2 and will swing downwardly to dumping position as shown in Fig. 6. The contents of the container will thus be delivered onto the uppermost flat surface of the screen drum, the fluid flowing through the screen and into the trough 55 and thence through the outlet 56 into the cup C which has been placed on the support 58. After the dumping operation and while the parts are being actuated to reset, the screen drum will be given a partial rotation so that ultimately that surface on which the grounds of coffee had been deposited will be submerged within the water contained in tank 46 and will be floated therefrom so that when said surface is again used, it will be substantially free of grounds. Thus the screen drum serves as in intermittently operated conveyor for carrying the grounds from the transfer container to the receptacle beneath said conveyor or drum.

As has already been stated, this machine is adapted not only for preparing hot coffee but could also be used for preparing hot tea, hot cocoa, etc.

What is claimed is:

1. In a beverage brewing and vending machine, the combination with a structure having a filling station and a delivery station and a receptacle beneath the delivery station, of a foraminous rotatable drum within and extending above the receptacle, a receiver surrounded by the drum, said drum constituting a conveyor, a structure mounted for intermittent rotation, a transfer container hingedly connected to said structure and positioned to tilt downwardly along a plane radiating from the axis of rotation of said structure, separate means at the filling station for directing solid and fluid materials into the transfer container, means for rotating the structure intermittently in one direction to shift the transfer container from the filling station to the delivery station, stationary means interposed between said stations for holding the container against tilting movement, and for releasing the container for tilting upon reaching the delivery station, thereby to dump the solid material onto the drum, at a point above the receiver and direct liquid material through the drum and into the receiver, and means operated by the movement of the rotatable structure for actuating the drum, thereby to convey the solid material thereon from above the receiver and into the receptacle beneath the drum.

2. In a beverage brewing and vending machine, a structure having a filling station and a delivery station, a receiver beneath the delivery station, a receptacle at the delivery station, a foraminous conveying drum mounted for rotation about the receiver and extending downwardly into the receptacle, a structure mounted for rotation, mechanism for intermittently rotating said structure in one direction, a transfer container hingedly connected to said structure for downward swinging movement along a plane radiating from the axis of rotation of the structure, separate means at the filling station for directing solid and liquid materials into the container, and stationary means beneath the transfer container for supporting said container against tilting movement while moving from one station to the other and for releasing said container for tilting motion on reaching the delivery station, said container constituting means for dumping its solid material contents at the delivery station onto the drum at a point over the receiver, and its liquid material contents through the drum at that point into the receiver, and means actuated by the movement of the transfer container with the rotatable structure for rotating the drum to convey the solid material delivered thereonto downwardly to the receptacle thereunder.

3. In a beverage brewing and vending machine, the combination with a structure having a filling station, a delivery station, a receiver below the delivery station, and a receptacle at said station and means at the filling station for delivering solid and liquid materials respectively, of means for conveying the solid materials from the filling station to the delivery station, said means including a rotatable structure, means for intermittently actuating the same, a transfer container hingedly connected to the rotatable structure and mounted to swing outwardly and downwardly relative thereto along a plane extending radially from the axis of rotation of the structure, stationary means for supporting the transfer container against tilting movement while travelling with the rotatable structure and for releasing said container to dump its contents on arriving at the delivery station, and a rotatable foraminous drum in the receptacle extending over and surrounding the receiver to receive the dumped material at a point above the receiver, thereby to separate the solid material from the liquid material and direct the liquid material into the receiver, and means controlled by the rotation of said structure for intermittently rotating the drum to convey the deposited granular material to that portion of the receptacle beneath the drum.

4. In a beverage brewing and vending machine, the combination with a structure having a filling station, a delivery station, a receptacle at the delivery station for receiving fluids, and a receptacle at the delivery station for receiving granular material, of means at the filling station for delivering granular material and liquid, and means for conveying the granular material and liquid from the filling station to the respective receptacles, said means including a rotatable structure, a transfer container movable with said structure and mounted for downward swinging movement relative thereto along a plane radiating from the axis of rotation of the structure, means for intermittently rotating the structure to move the transfer container from the filling station to the delivery station, means for supporting the transfer container against tilting movement while moving between the stations and for releasing to tilt when at the delivery station, thereby to deliver its contents at the delivery station, and a rotatable screen positioned at the delivery station to receive the delivered material and convey the granular material downwardly into the receptacle for granular material, the receptacle for liquid being positioned within the conveyor to receive liquid draining therethrough, and means operated by the rotation of the structure for intermittently actuating the conveying means.

IOLA S. LIME.

REFERENCES CITED

The following references are of record in the file of this patent:

UNITED STATES PATENTS

| Number | Name | Date |
|---|---|---|
| 1,159,136 | Vaudreuil | Nov. 2, 1915 |
| 2,238,972 | Chapman | Apr. 22, 1941 |
| 1,980,931 | Rothermel | Nov. 13, 1934 |
| 2,286,130 | Vergobbi | June 9, 1942 |
| 1,650,151 | Patterson | Nov. 22, 1927 |
| 2,013,694 | Melzer | Sept. 10, 1935 |
| 2,194,807 | Oyen et al. | Mar. 26, 1940 |
| 1,668,540 | McAllen | May 1, 1928 |